United States Patent [19]

Schroeder et al.

[11] Patent Number: 5,041,326

[45] Date of Patent: Aug. 20, 1991

[54] ELECTROLUMINESCENT LAMINATE ASSEMBLY

[76] Inventors: Becky J. Schroeder; Charles F. Schroeder, both of 2317 Valleybrook Dr., Toledo, Ohio 43615

[21] Appl. No.: 661,453

[22] Filed: Oct. 16, 1984

Related U.S. Application Data

[60] Continuation-in-part of Ser. No. 219,497, Dec. 30, 1980, abandoned, which is a division of Ser. No. 46,103, Jun. 6, 1979, abandoned, which is a continuation-in-part of Ser. No. 796,896, May 16, 1977, abandoned, which is a continuation-in-part of Ser. No. 639,200, Dec. 9, 1975, Pat. No. 4,024,404.

[51] Int. Cl.[5] .......................... B32B 3/10; B32B 3/30; F21K 2/00

[52] U.S. Cl. ................................ 428/161; 250/462.1; 428/172; 428/195; 428/203; 428/323; 428/690; 428/913

[58] Field of Search ..................... 250/462.1; 252/316; 428/320.2, 321.5, 402.2, 402.24, 913, 323, 690, 156, 161, 172, 195, 203

[56] References Cited

U.S. PATENT DOCUMENTS 4,024,404 5/1977 Schroeder ........................ 250/462.1

FOREIGN PATENT DOCUMENTS 4878023 3/1975 Japan .................................. 252/316

*Primary Examiner*—Bruce H. Hess

*Attorney, Agent, or Firm*—Charles F. Schroeder

[57] ABSTRACT

An electroluminescent laminate assembly or panel adaptable to formation of images of light generated by light emitting matter. The luminescent laminate is arranged with light emitting sections shaped in the form of images desired. In addition, different gradations in light intensities can be imparted to different segments of the field of the desired image for apparent three dimensional effects by selective provision of thick and thin regions of the light emitting matter between the electrodes. The electrodes are also disclosed as capable of formation from compositions of conductive material which in some instances can be sprayed in place and in others doctor-bladed in place to different thicknesses for application of different electrical forces to different sections of the light emitting matter of the assembly for desired preselected patterned light outputs. In this regard electrodes are disclosed as being capable of having preselected thickness differences over their major dimensions for desired lighting output effects. In addition, microencapsulated phosphorescent matter is disclosed as one form of such light emitting matter adaptable to providing the lighting effects desired of the invention.

6 Claims, 5 Drawing Sheets

ELECTROLUMINESCENT LAMINATE ASSEMBLY

This is a continuation-in-part of co-pending application Ser. No. 219,497, filed Dec. 30, 1980, abandoned, a division of Ser. No. 046,103 filed June 6, 1979, abandoned, a continuation-in-part of Ser. No. 796,896 filed May 16, 1977, abandoned, which was a continuation-in-part of Ser. No. 639,200 filed Dec. 9, 1975, now U.S. Pat. No. 4,024,404, issued May 17, 1977.

This invention relates to an electroluminescent laminate assembly or panel in which a light field or images are composed of light generated by light emitting matter. The luminescent laminate is different from prior art laminates in that the light phosphors are shaped in the laminate to provide the lighting effects desired. In addition, the thickness of the phosphor layer can be made selectively different over the area of a light field or image to impart variations in light output to conform to desired lighting effects.

According to the invention variations in thickness of one or both electrodes can be provided within small portions or segments of their overall areas to exert different electrical influences on the phosphors for different lighting effects. The concentrations of conductive material can also be made different within the various segmental portions of the area of the electrodes for different degrees of conductivity to impart various lighting effects particularly images to be produced. Thus a range of variation in lighting effects can be provided according to this invention to enhance the adaptability of electroluminescent laminate assemblies to many uses, including new art forms in which embossed and or a semblance of three dimensional luminous images can be provided. Thus different luminous type business or medical forms can be produced to provide a backing for use with writing paper to permit persons to fill in such forms in the dark such as in places where a minimum level of light can be tolerated. It has been established that only a low level of back lighting is required to enable one to write in the dark.

A notepad size electroluminescent panel energized by a power source as small as a commercially available penlight cell will provide sufficient backlighting of overlying paper sheets for writing and reading in the dark. According to the invention, since the energy source is small it can be combined directly with the luminescent backing sheet to make it a self-contained portable unit which can be readily inserted under the expanse of a writing sheet. The electrically energized sheet thus can be made into the form of a vest pocket light source or a panel for ready carriage with a writing pad, or incorporated in a clipboard assembly to make it readily accessible for use in the dark.

In this regard, the invention becomes useful in laboratory work where observations are to be conducted in the dark. The invention can be used also in outer space travels where the electrical systems of the spacecraft are required to be shut down for planned periods to permit recharging of equipment. Still further, the invention has practical value in writing in automobiles after dark without the need for internal lighting which has a tendency to distract and disturb the driver.

In view of the foregoing it is an object of the present invention to provide means in the form of a luminescent backing sheet for writing paper which will provide back light in the dark, permitting a writer to write in straight lines without additional light.

Another object of this invention is to provide a portable lightweight, light source for use in reading and writing in the dark.

Still another object of the invention is to provide a portable back lighting sheet or panel which can be easily produced and readily adapted for reading or writing in dimly lit spaces or in total darkness.

Another object of the invention is to provide a light source for reading and writing in the dark which is adaptable to using a minimum of energy for the functional purposes to which it is put.

Still another object is to provide a light output with a minimum size distributive power source to promote minimum size, cost and power consumption.

A still further object of the invention is to provide a portable thin lightweight planar light unit having a self-contained power source and arranged to effect distributive energization of segments in selected patterned relations dependent upon the results sought.

In general, according to the invention, the backing sheet for insertion under the writing paper is a portable electroluminescent sheet having its own power source integral therewith. The electroluminescent sheet lends itself to receipt of guidelines directly thereon or on an overlay sheet, or for some purposes the light intensity may be raised and the guidelines omitted.

The electroluminescent sheet can be made in any of a wide range of sizes and can be made flexible or rigid and of different thicknesses as needs and various uses dictate.

A feature of the invention lies in its low power consumption, and in view of its operability with a small power source at a relatively low voltage it can be made into a simple and safe construction. The portability and low energy consumption of the unit in addition to its thin and capability of flexible construction lend to providing a lighting unit believed to be new in the art.

Other objects and structural features which are believed to be characteristic of the invention are set forth with particular in the appended claims. My invention, however, both in organization and manner of construction, together with further objects and features thereof may be best understood by reference to the following description taken in connection with the accompanying drawings in which:

Figure 19:
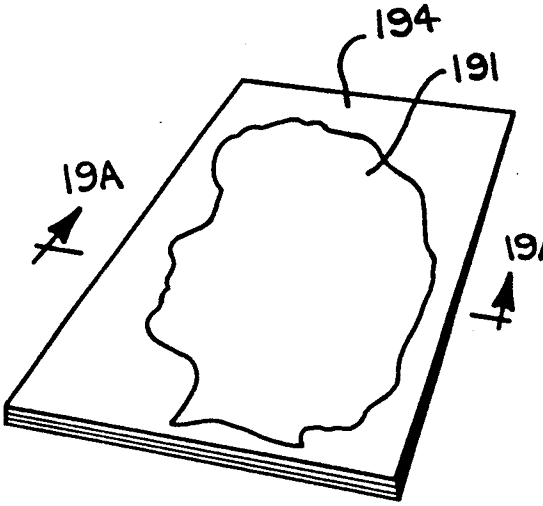
FIG. 19 is a view of an electroluminescent panel in which the light emitting matter is in the form of an image.
Figure 19A:
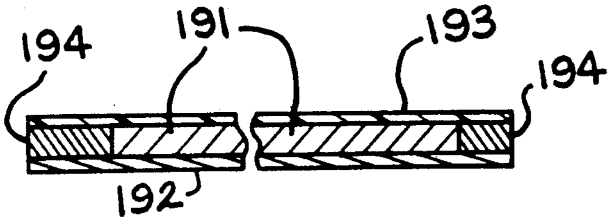

FIG. 19*a* is a cross-sectional illustration of the panel of FIG. 19 taken on line 19*a*—*19a.*

Figure 19B:
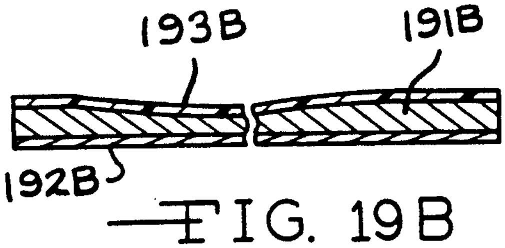

FIG. 19*b* is a cross-sectional view of a panel like that of FIG. 19 in which the phosphor layer has more than one thickness.

Figure 20:
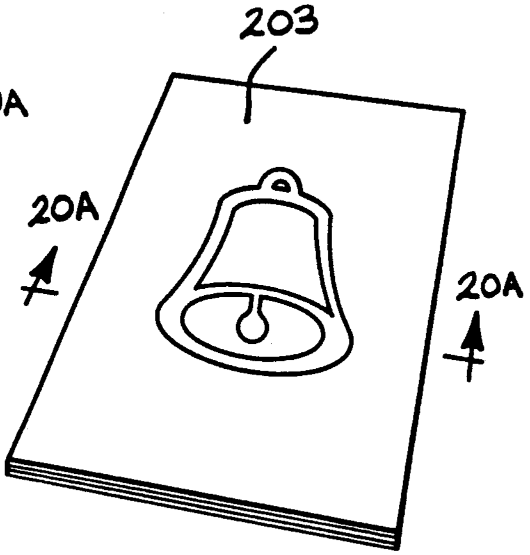

FIG. 20 is a view of an electroluminescent panel in which a luminescent image is produced by providing raised portions on the top electrode lines arranged in a patterned form to produce the image of a bell.

Figure 20A:
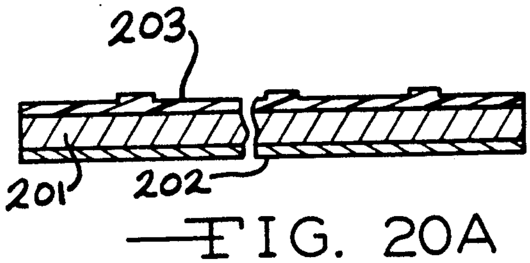

FIG. 20*a* is a cross-sectional illustration of the panel of FIG. 20 taken on line 20*a*—*20a.*

Figure 20B:
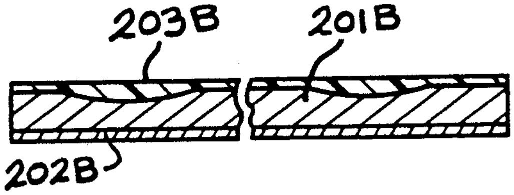

FIG. 20*b* is a cross-sectional view of a panel like that of FIG. 20 in which the thickness variation of the top electrode is inversely matched by variations in the thickness of the underlying phosphor layer to produce desired variations in the light output of the assembly.

Figure 1:
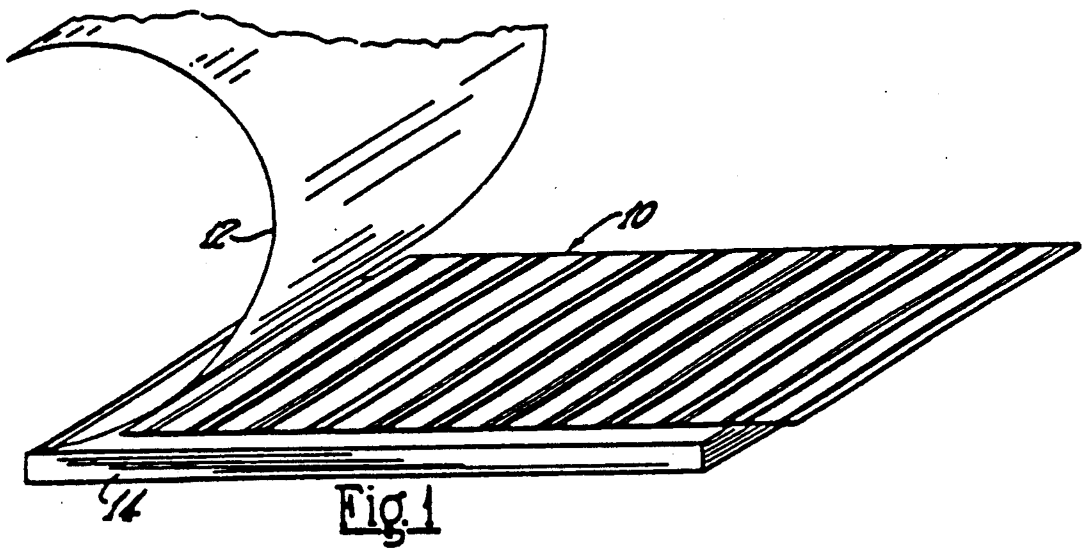
FIG. 1 is a perspective view of a writing tablet with a backing sheet of this invention in partially inserted position under the first paper sheet of the tablet.

Referring to the drawings in greater detail, FIG. 1 illustrates a tablet of writing paper 14 having a top sheet 12 lifted and turned back for insertion of a phosphorescent backing sheet 10 of the invention. As may be seen, the backing sheet can be provided with double lines or extra thick lines if desired.

Figure 2:
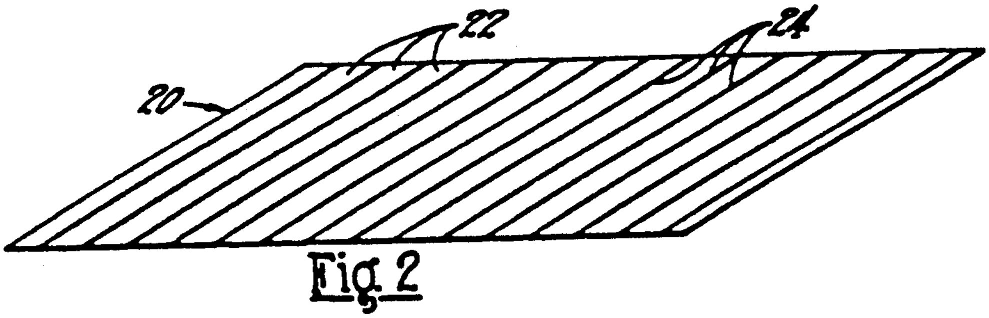
FIG. 2 is a perspective view of a phosphorescent backing sheet of this invention in which the guidelines are nonphosphorescent.

FIG. 2 illustrates a phosphorescent sheet 20 for use with the writing tablet 14 wherein the phosphorescent portions extend over the major portion of the sheet with lines 24 being non-phosphorescent. This sheet can be formed by applying phosphorescent matter in the form of paint or ink over the entire sheet with the non-phosphorescent lines being formed by the absence of phosphorescent material or by an overlay of non-phosphorescent material such as ink or narrow strips of tape. When viewed through the writing paper, written material above the lines is visible against the phosphorescent backing.

Whether or not the writing paper backed by the luminescent sheet of the present invention is lines or unlines, the guidelines enable orderly writing in the dark where ordinarily marked lines are ineffective. Where the writing paper is unlined, sharply marked dark lines on the backing sheet over a phosphorescent base provide guides for orderly handwriting both in the presence of light or in darkness.

Figure 3:
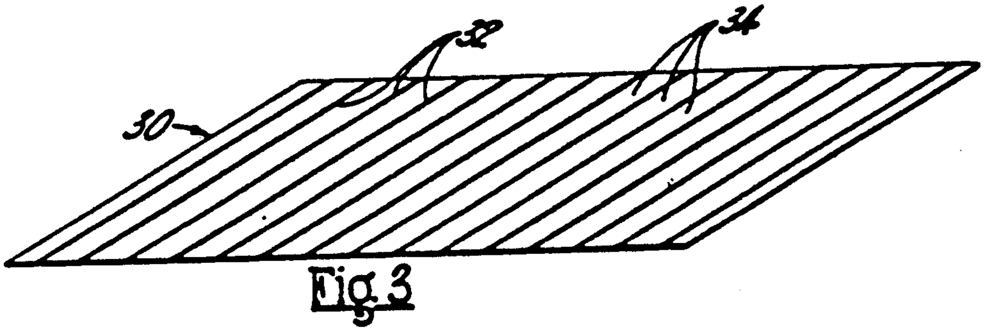
FIG. 3 is a perspective view of another embodiment of the invention in which the guidelines are of phosphorescent material.

FIG. 3 illustrates another embodiment of the invention wherein the backing sheet 30 is provided with parallel phosphorescent lines 32 while the in between portions 34 are non-phosphorescent. This form of the invention has the advantage of needing only a minimum of phosphorescent material and is accordingly inexpensive.

Figure 4:
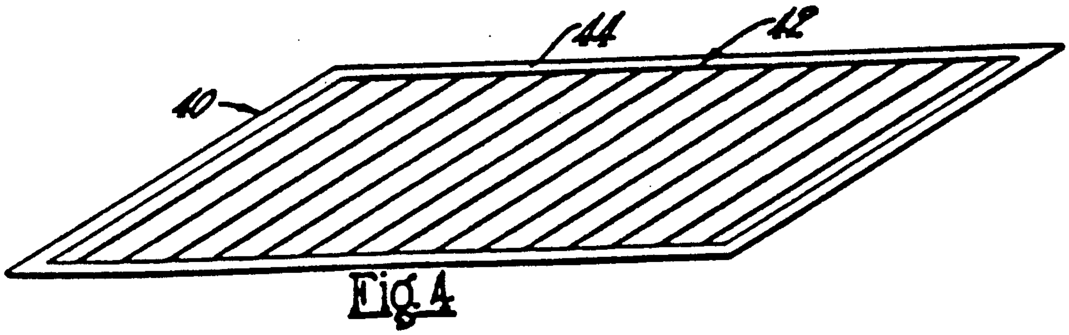
FIG. 4 is a perspective view of another form of the invention in which the phosphorescent portions are embodied in a plastic sheet.

While the phosphorescent backing sheets illustrated in FIGS. 1 to 3 may be any of a number of sheet materials such as ordinary paper, vellum, or even cloth, FIG. 4 is illustrative of a plastic sheet which may be phosphorescent material itself. It might be transluscent or transparent and thermoplastic, enabling encasement of non-phosphorescent line portions, embodied therein. It is perfectly smooth and might be thicker and less flexible than the writing paper itself to facilitate easier writing thereon for greater legibility. The horizontal and marginal lines for the written material might be black or a dark color and non-phosphorescent while the remaining portions of the sheet might be of phosphorescent plastic so that the backing sheet might be utilized either day or night for guidance or handwritten material when the writing paper is placed in overlying relation thereto. That is, by making the guide lines of the plastic sheet contrastingly visible through the writing paper, the sheet can be used for guide purposes under ordinary light as well as in darkness.

The portable luminescent panel of the invention may be an electrically energized panel as well as a light activatable phosphorescent sheet. To activate the light activatable phosphorescent material as a guide for writing in the dark, it is exposed to a light for a period dependent upon intensity of the light. It is found that a sheet of such material requires exposure to ordinary light for a period of only a moment to provide an adequate charge to provide adequate phosphorescence for writing for a period of a quarter of an hour or more.

Figure 5:
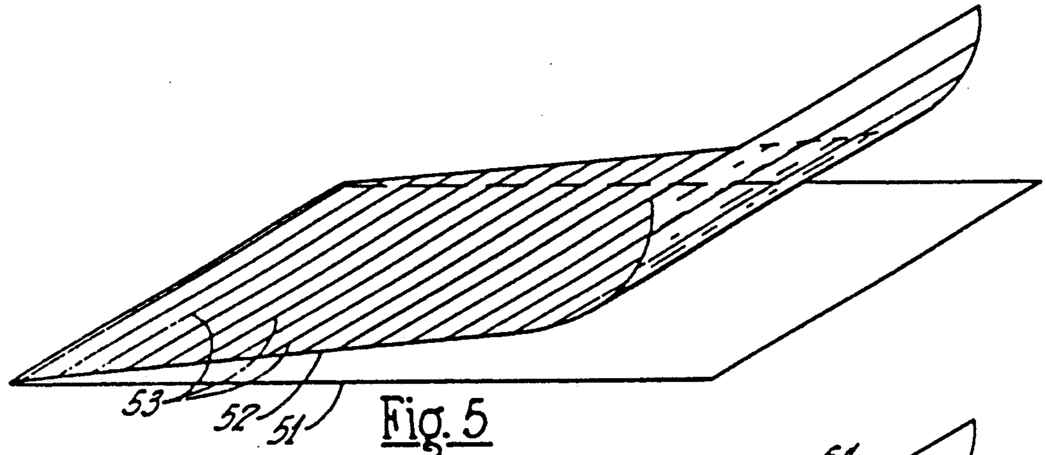
FIG. 5 is a perspective view of still another form of the invention in which guidelines are provided on a transparent sheet assembled with a phosphorescent surfaced backing sheet.
Figure 6:
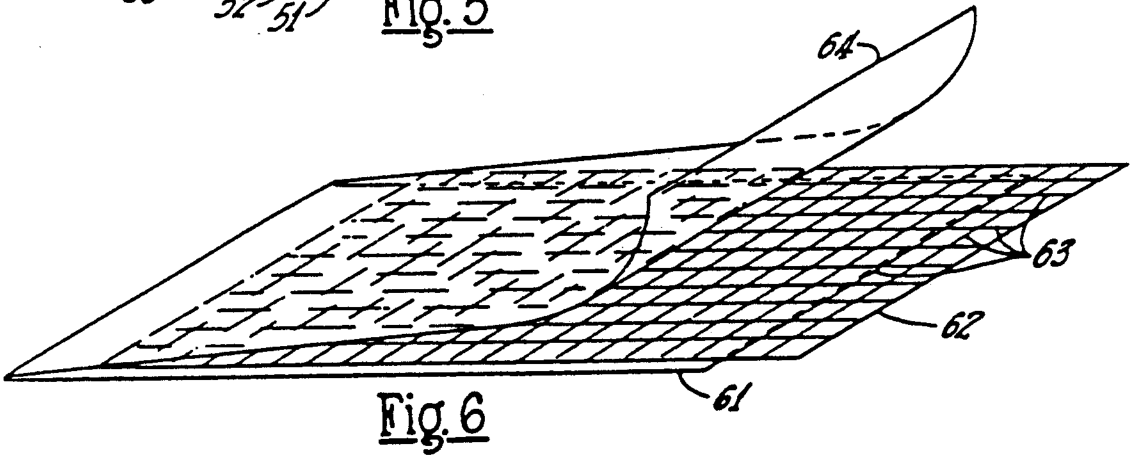
FIG. 6 is a perspective view of another assembly arrangement of the invention in which guidelines are provided on an overlay sheet interposed between a transparent top sheet and a phosphorescent surface member to which it is attached.

In another form of the invention, a luminescent sheet 51 may be assembled as shown in FIG. 5 with a translucent or transparent overlay sheet 52 having relatively opaque guide lines 53 thereon. The assembly can be clipped, adhesively bonded or otherwise suitably secured together with the luminescent sheet, or as shown in FIG. 6 an overlay sheet 62 having guide lines 63 may be held in place between a translucent or transparent top sheet 64 such as of plastic suitably secured along one marginal or edge region of the luminescent sheet 61. This combination provides a flexibility in that the overlay sheet may be replaced with sheets having any number of guide line arrangements for combination with the phosphorescent sheet, while at the same time being readily placed under writing sheets for guiding application of matter thereto in the dark.

In regard to the foregoing reference herein to written material being visible against the phosphorescent backing, it has been found that reading matter can be readily read in complete darkness if the letters of the reading matter have a sufficient body to be silhouetted against the luminescent background. Thus if handwritten matter is written with a thick line, such as with a felt tip pen, or if printed matter is in letters having line thicknesses providing a bold appearance, reading matter can be read readily against a luminescent background both in lighted as well as in dim and dark spaces. The reading matter if on an overlay sheet of light transmitting material, such as a translucent or a transparent sheet can thus be read readily in dark spaces such as in hospitals, laboratories or on menus in dimly lit restaurants.

Figure 7:
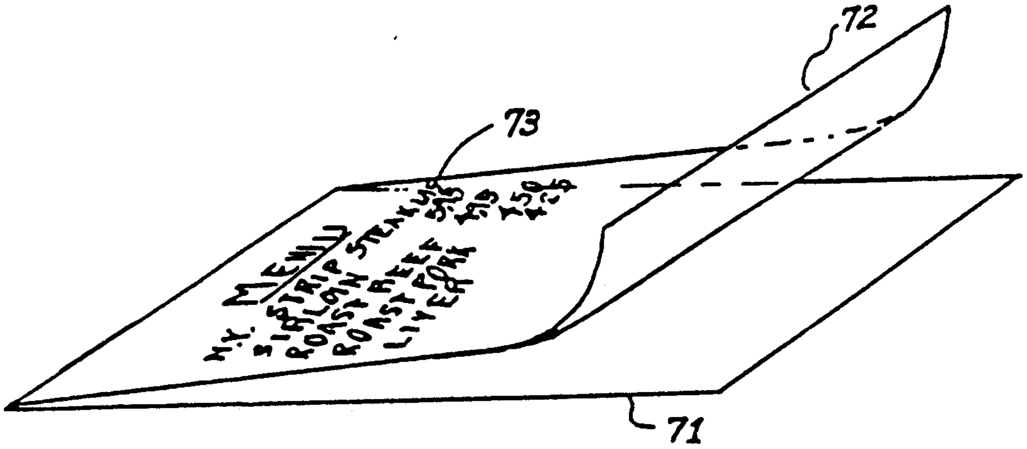
FIG. 7 is a perspective view of still another assembly of the invention in which reading matter is provided on a transparent sheet overlaying a phosphorescent surfaced member.

As illustrated in FIG. 7, the letters 73 of the reading matter on the light transmitting overlay sheet 72 may be of ordinary non-glowing matter in black or in color which will provide a ready contrast against the reflective color of the luminescent backing 71 in lighted spaces. It is well known in physics that light is invisible in space and made visible only when transmitted or reflected from a surface. In this regard, where light is present in a space, the reflective color character of the matter to be read in such light can be selected for the desired contrast against the reflective color of the luminescent background sheet in such light. Colors of the letters can thus be selected for their contrasting visibility in ordinary light but in addition, where the reading matter is to be read in dim light or in darkness, the thickness of the lines of the letters are selected so that they can be seen in silhouetted form against the luminescent background. In such case the ordinary non-glowing reading matter will appear black against the luminescent background regardless of its color in ordinary light. Letters written with a line thickness greater than from a little under 1/16" width and letters printed in 24 point letter sizes and greater will provide silhouetted forms which can be read quite clearly in darkness against a low light luminescent background as little as one foot lombert or less. In this regard, printing such as for menus it has been found provides satisfactory visibility in the dark when in the range of 24–72 point print.

As an alternate to such letters of reading matter being of non-glowing material, fluorescent material can be utilized for the letters entirely or to outline or to interlineate letters or other intelligible matter.

As still another arrangement for ease of reading or greater clarity in darkness, the intelligible matter can be made with phosphorescent material having a contrasting reflective color in ordinary light against the reflective color of the luminescent backing material. The phosphorescent material of the matter can also be selected for its contrasting luminescent color against the color of the background glow.

The above described arrangement has the feature that when printed reading matter is incorporated in a form such as a menu, a light transmitting overlay on which the reading matter is applied can be readily replaced over the more expensive luminescent backing surface. The luminescent assembly thus can need only use a single luminescent backing surface while the overlay menu sheet can be changed inexpensively with each meal change. The replacement sheets can be readily printed on transparent, translucent or ordinary writing sheets in a conventional duplicating machine. The sheets can be associated with a phosphorescent backing surface in a simple holding assembly. In this regard, the holding assembly might be a luminescent backing provided with an overlying outer transparent face which in a sense forms an envelope within which the printed sheet can be merely slipped for use according to the principles of the present disclosure.

Beside reading material on an overlay sheet thus being visible as set out above, sketches and images and other intelligible matter such as graphs and grids can also be seen more readily according to the principles set out above.

Still further, phosphorescent matter having different rates of decay can be restored to provide the capability of reading and writing in darkness. In this regard fluorescent and phosphorescent materials having different luminescent decay rates can be incorporated into images to form a composite of the overlay and backing sheet to impart apparent motion to the image. Further in this regard two or more phosphorescent colored materials, or two, three or more fluorescent and phosphorescent materials of different decay rates can be incorporated into an image with very unusual visual results.

Intelligible matter can also be applied to an overlay sheet or on the luminescent surface itself with fluorescent matter matched in its activated and reflective color to the color of the luminescent surface. The fluorescent material thus can be made to blend in with the luminescent background and not be visible when activated such as by a light source. It can be made visible as dark silhouetted matter against the luminescent surface, however, by removing it from exposure to the activating source. This principle of invisibility during activation and visibility in darkness when not activated can also be inverted by blending the color of phosphorescent matter in with a fluorescent background during exposure to an activating source and the continuing glow of the phosphorescent material can be made visible in darkness and in contrast to the non-glowing fluorescent material not under the influence of an activating source.

Figure 8:
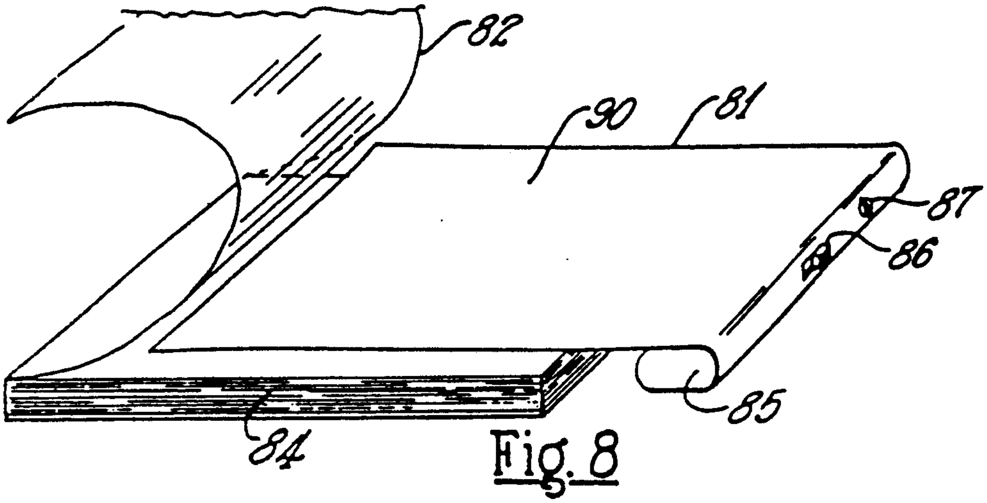
FIG. 8 is a perspective view of a writing tablet with an electroluminescent backing panel of this invention in partially inserted position under the first paper sheet of the tablet.

As shown in FIG. 8 and as described briefly above, the luminescent backing sheet of the invention may be in the form of an electroluminescent sheet or panel 81 having an integral power supply 85 which can be turned on or off at will to provide the light from the light emitting surface 90. The power supply may be placed within a compartment and be of lightweight construction so that the panel can be completely self activated and portable. The panel may be made in various sizes but as shown can be in the form of a thin sheet which can be inserted under the top sheet 82 of a pad of writing paper 84. It can be dimensioned to conform to the area of the writing sheet and can provide as much light as is emitted by the foregoing described light activated phosphorescent sheet or more as desired by provision of a brightness control 87. The panel can be turned on and off at will by an on/off switch 86.

The luminescent sheet can be a phosphorescent sheet which carries a layer of electroluminescent material such as a phosphor like zinc sulfide containing copper or silver added to make it electrically activatable. The layer of luminescent material may be a direct current activatable phosphor material or an alternating or pulsed current phosphor material. In some instances both alternating or pulsed current plus a direct current bias will provide the light output desired.

Since the light output of a electroluminescent panel can be varied such as by varying either the frequency or voltage of the electrical source by way of control such as a voltage control 87, the brightness of the light emitted can be raised to a level such that guide lines may be less needed. Where the light output is dim, however, guidelines can be provided on an overlay sheet as desired over the electro-luminescent sheet.

A unique aspect of the invention is the low level of light which will provide the results desired whereas in the prior art brighter and brighter electroluminescent panels have been sought.

The power supply for the electroluminescent panel 81 can be provided by a commercially available battery, such as a pen-light type dry-cell 88 which activates an inverter circuit 89 to convert the direct current to alternating or pulsed current for activation of the light emitting surface 90. The electroluminescent panels themselves are most frequently constructed with an underlying electrode of conductive material such as a metal plate or a metal foil and an overlying electrode of transparent conductive material between which a phosphorescent material is interposed to be activated by the top and bottom electrodes. The overall assemblage has the properties of a condenser and as such the power consumption for activation of the phosphor layer is small.

For higher voltages, the thickness of the layer of phosphor must be thick enough to withstand the dielectric stress. For the lower voltages of most commercially available batteries, however the thickness of the dielectric phosphor layer according to the present invention can be reduced considerably thereby reducing the weight of the sheet and allowing it to be more flexible as well as reducing the cost of the assemblage. Thus the present invention lends itself to a low cost production of electroluminescent panels and production of light with very little power consumption. In addition, the lightweight construction lends itself to portability and provision of a pocket size source of light for writing as well as reading in the dark.

The power supply may be incorporated in a compartment integral with the electroluminescent sheet base or in a separate compartment attached to the electroluminescent panel or sheet.

Since the voltages involved in activation of the panel are low and safe for handling without special care, the power supply may be made separate and can be arranged to be clipped-on along an edge region of the panel where the panel itself is provided with marginal regions to expose the top and bottom electrodes for clip-on of the power supply.

Figure 9:
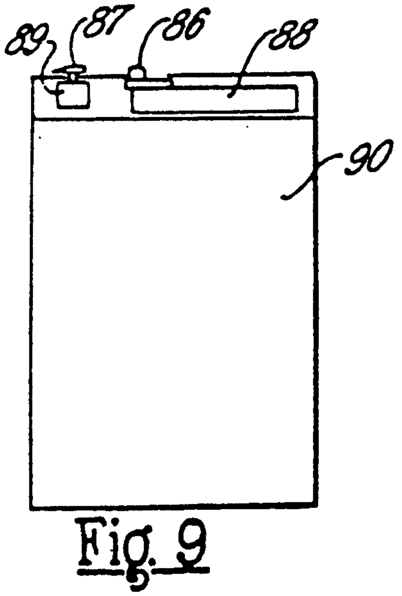
FIG. 9 is a plan view of the backing panel of FIG. 8 showing the location of the battery and associated electric power circuit for activation of the panel.

As shown in FIG. 9, the battery 88 can be a pen-light cell connected to a circuit of small proportions such as a solid-state chip 89 which in turn is connected to the top and bottom electrodes of the panel 81 to activate the light emitting surface 90. The battery and the circuit can be conveniently incorporated in a capsule-like enclosure which can be located at the edge of the panel or sheet. In view of the convenience of this compartmentalized enclosure for the power source, it lends itself to being made integral with or removeably secured to the panel. If made integral, it can be molded so as to receive the panel in inserted relation for electrical communication with the circuit. If made removeable, the capsule can be arranged to be clipped into place at any of a number of positions along the edge of the sheet where communication with the electrodes is made possible.

The possibility of a relatively low voltage battery operated source allows provision of a lighting sheet which is electrically safe in use and reduces the need for a heavily protected panel and lowers the cost of production. The panel may be made rigid or flexible as desired. It can be made rigid if the base electrode is a metal plate. It can be made flexible if the base electrode is a metal foil. In this regard, the sheet may be made relatively simple in construction with a thin phosphorescent layer disposed between a conductive metal base electrode such as a metal foil and an overlying electrode of transparent conductive material. The thinness of the layer of the electroluminescent material adds to making the sheet flexible which lends itself to being rolled and clipped about the battery or withdrawably placed in a capsule or tube when not in use. In the latter instance, when ready to be used, the flexible sheet can be withdrawn from the capsule to any length desired up to its full length.

Figure 10:
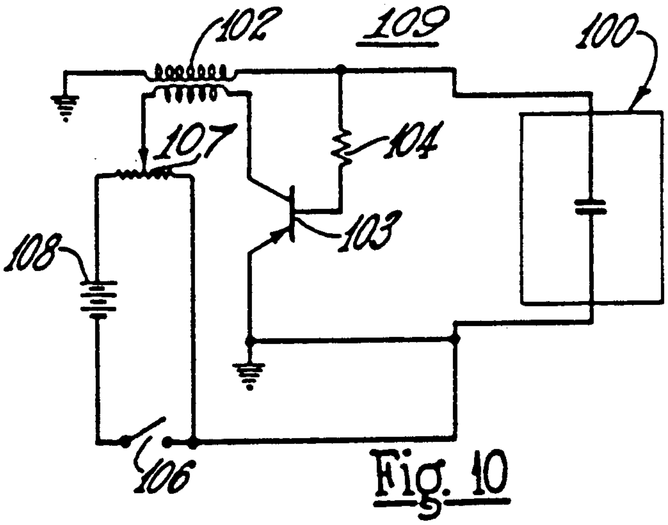
FIG. 10 is a diagramatic illustration of a prior art circuit representative of a battery powered light activating circuit of design which will lend itself to compact, lightweight direct association with an electroluminescent panel according to the invention.

FIG. 10 illustrates a circuit representative of a prior art type of circuit which can be used to activate an electroluminescent panel according to the invention. The circuit is selected for its capability of compact and lightweight construction as well as its simplicity, ruggedness and low manufacturing cost. In the specific arrangement shown, an oscillator 109 includes a transformer 102, a transistor 103, a fixed resistor 104 and a voltage divider 107. A battery 108 which supplies energy to the circuit upon closure of an on-off switch 106 may be a replaceable commercial dry cell. It also can be a rechargeable battery if desired. The direct-current voltage applied to the circuit is converted by the circuit to an alternating current voltage for activation of the electroluminescent panel 100 represented by a capacitance symbol. Variation of either voltage or frequency of the activating energy will change brightness of light output.

In the circuit of FIG. 10, the voltage divider 107 which enables variation of the activating voltage provides a brightness control for the panel. Alternately, the circuit output to the sheet can be arranged to be varied through a frequency varying control incorporated in the oscillator circuit to permit variation of the light output from the panel. The circuit shown is meant to be only representative since many forms of activating circuits can fulfill the requirements of the invention, including circuits which will provide pulsed energy or alternating energy, or alternating or pulsed energy in combination with a DC biasing voltage, or simple DC energy where the luminescent panel is direct-current activatable.

Figure 11:
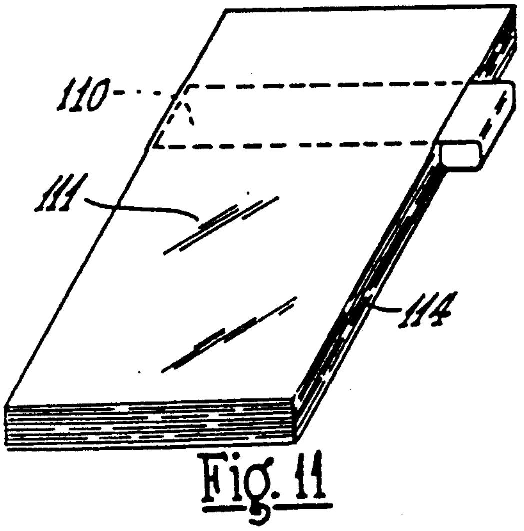
FIG. 11 is a perspective view of an electroluminescent sheet of smaller size than the writing sheet with which it is used illustrating how a small portable pocket size panel with its own power source can be used for backlighting of larger size writing sheets.

FIG. 11 illustrates an electroluminescent panel of the invention which is smaller than the size of the paper on which matter is to be written in the dark. In this arrangement the panel 110 is made generally as long as the width of the writing field of the sheet of paper and has width dimension which will provide a luminescent field sufficient for writing in the dark. As the portion of the paper overlying the panel is filled with written material, the panel can be moved progressively downward to light unused portions of the sheet. In this way a sheet or writing paper 111 of a size such as a pad 114 can be adequately lit with very little light for writing in the dark and with very little consumption of power. The panel can be made of size to fit the pocket and can be used conveniently with a pocket notebook as well. In addition, such a panel can be used for other lighting purposes in the dark, such as lighting the keyhole of a lock when no other source of light is available.

Figure 12:
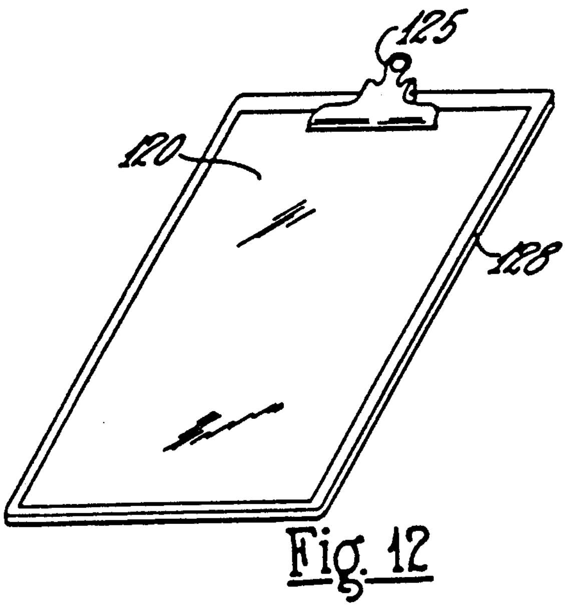
FIG. 12 illustrates an electroluminescent panel of the invention wherein the battery source is integrated in extended relation over the back of the panel.

FIG. 12 illustrates another form of the invention in which the battery 128 is of planar shape underlying the electroluminescent panel 120. The thin planar battery may form a permanent base for the electroluminescent panel and when its effective energy is completely used, the unit may be thrown away. Preferably, however, the battery 128 is arranged to be replaceable with another battery. In such an arrangement the electroluminescent panel 120 might be made in the form of a clipboard with a clip 125 for holding writing paper on which written material is to be applied in the dark. This form of the invention has particular usefulness in hospitals where a patient's records are to be filled in at night by a nurse at the patient's bedside.

In another arrangement of the invention, a light activated sheet can be provided on the back side of the light emitting panel. Thus both a light activatable and an electrically activated luminescent side of the panel can be provided for use in the dark.

Additionally, a thin light-activatable sheet or layer can be provided in overlying relation with the light emitting surface of an electroluminescent panel. The light activatable layer can be made sufficiently thin that light given off therefrom can be both seen as well as activated from the front and back sides of the layer. The electroluminescent light output can thus pass through the light activated layer to permit use of the energized panel while at the same time causing the light activatable layer to become activated so that upon shut-off of the electrical energy, the glow of the light activated layer can continue for use in writing and reading in the dark. In this way, the available energy can be conserved. In addition, the electrical circuit can be arranged to effect an intermittent energization and deenergization of the electroluminescent panel at a frequency to provide a sustained light output from the combination of light emitting layers for continuous use at desired light output levels. The capacitance of the panel itself might be used as a component of the circuit effecting such energization.

Further in this regard, the electroluminescent material of the electrically activated panel can be provided with a more sustained output or an appreciable persistence such that the frequency and periodicity of activation can be selected for low level power consumption at a desired light output level.

Figure 13:
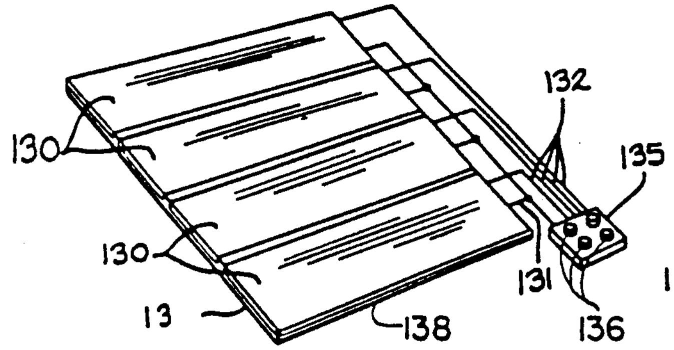
FIG. 13 illustrates partly schematically an electroluminescent panel assembly of the invention in which four electroluminescent cells are aligned side-by-side to form light emitting strips of a light field according to the invention.

FIG. 13 illustrates four electroluminescent cells 130 which form strips lined in side-by-side relation and mounted on a base 138 of suitable rigid material such as chipboard to provide a light field made up of the four cells 130. Each of the cells is energized by way of a pair of conductors, a conductor 131 common to each cell and a conductor 132, which are connected to a power source 135 having individual switches 136 illustrated schematically associated therewith for selective energization of any one or more of the cells or all of them simultaneously to cause light to be emitted from selected portions of the light field or the entire light field. Although only four are shown in the panel assembly illustrated, it will be recognized that any number of light cells can be utilized. The spaces between the light cells provide dark regions which can act as guidelines such as for writing paper placed over the assembly for writing purposes.

Figure 15:
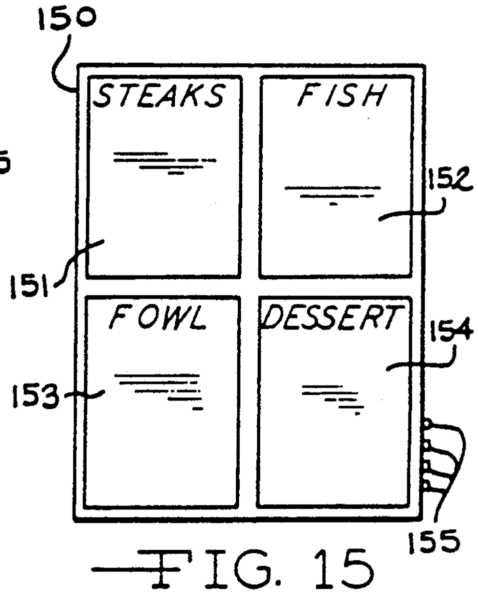
FIG. 15 shows an arrangement of light emitting regions in a menu wherein each area may be energized independently of others of the assembly.

Such an assembly can be arranged with wider or narrower light strips to conform to predetermined pattern. In this regard the assembly can be arranged as in FIG. 15 to provide backlighting for a menu 150 with different light cells each arranged to permit selective reading of a portion of the menu. For example, chop type items of a steak section 151 as illustrated might be lit by one cell while the seafood section 152 can be lit by another and both of the remaining sections 153 and 154 can be lit selectively to permit separate reading of the and dessert sections or all simultaneously as desired by actuation of the associated respective pushbuttons 155.

Figure 14:
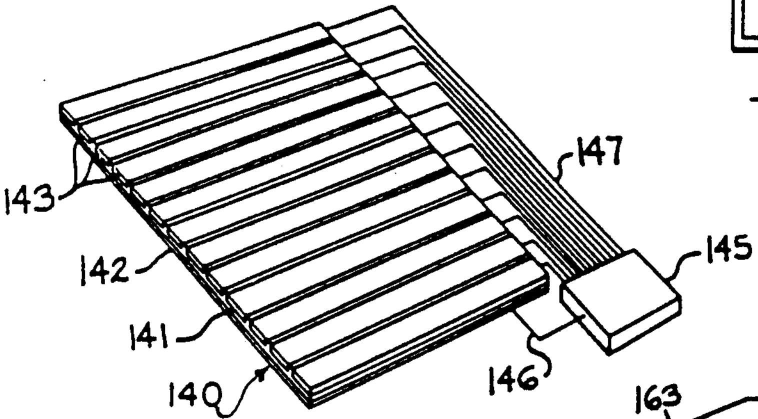
FIG. 14 illustrates partly schematically an electroluminescent panel assembly in which a light emitting layer is activated by a single coextensive electrode on one side and a plurality of side-by-side electrodes on the other side which are selectively activatable to energize the entire light field or only portions of the light field as desired.

FIG. 14 illustrates another arrangement of the invention in which electrically activatable light emitting matter of a lighting unit 140 is sandwiched between a coextensive electrode 142 and a plurality of independently and selectively activatable electrodes 143 on the opposite side. As illustrated, the electrodes 143 are transparent electrodes such as a tin oxide layer while the opposite electrode 142 may be of aluminum. Where use indicates a greater desirability of inverting this arrangement, however, the plurality of electrodes on one side of the activatable material may be opaque such as aluminum strips while the opposite side electrode common to the entire light of the electrically activatable material 141 may be a layer of tin oxide. Each of the electrode strips 143 is connected to a separate conductor 147 while the common electrode 141 is connected to a conductor 146. Both conductors 146 and 147 are connected to a power source 145 which energizes by switch selection any one or more of the electrodes 143 to permit energization of a portion of the light field or the entire light field as desired. The spaces between the electrodes 143 can be made to any width desired and in not being energized can be of size to provide dark regions between the light emitting regions which can be utilized as guidelines for writing in the dark when writing paper is placed over the light emitting field.

The circuitry of the power source 145 can be provided with a switching circuit of conventional clock type arranged to effect a progressive sequential energization of the light strips of the assembly. The frequency of energization of the strips can be at a slow rate for a visible effect of progression, or at a more rapid rate to produce the effect of a coherent light output from the entire light field or selected portions of the light field. Thus the power consumption for the total area lighted can be made small relative to a constant energization of the area since only one segment of the total field is energized each instant. Thus a power source only as large as is required to light a segment of the field is necessary and this can be switched electrically among the remaining segments of the lighted portion of the field at a rate sufficient that the normal eye persistence of an observer will cause an impression of a constant light output.

By way of example, if the frequency of energization is 600 hertz and 10 segments of a field are to be lighted, the power source can be switched to energize each segment at a rate of 30 times a second for a period of two hertz per energization which is quite adequate due to human eye persistence to provide the effect of a steady light output.

Figure 18:
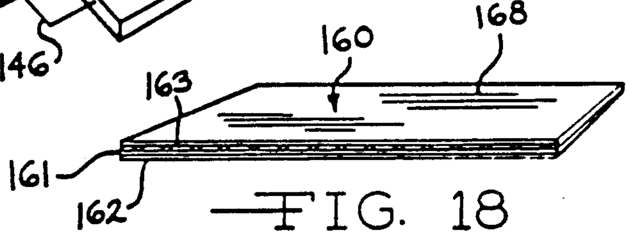
FIG. 18 illustrates a side elevational view of an arrangement like that of FIGS. 13 and 14 having a layer of light activatable matter thereover.

The light output can be imparted an appearance of greater stability by providing a thin layer or sheet of light activatable light emitting phosphorescent matter over the light field of a lighting unit of the type shown in FIG. 4. Such an arrangement is illustrated in FIG. 18 wherein a layer of light activatable phosphorescent matter 168 is placed over the light emitting surface of an electroluminescent lighting unit 160. The layer 168 is activated by the electroluminescent light emitted by the unit which is also visible through the layer 168. Thus a more persistent light output is produced by a combination of light activatable light and the light of electrically activated phosphorescent matter which is visible at the surface of the unit 160. The electrically activated light emitting matter 161 is energized between electrodes 163 and a common electrode 162 and the entire combination can be sealed against moisture between layers of polytetrafluoroethylene not shown. Thus a steadier and more persistent light output can be provided from the unit by reason of the slower light energy release or greater persistence of the overlying light activatable matter energized by the electrically energized light emitting matter.

Alternately, the electrically activated light emitting matter 161 can be provided in the form of a layer of microencapsulated particles in which the particles or small particle clumps are individually sealed against moisture in a light transmissive moisture resistant sheath such as a resinous film like a polyester also transmissive to the light activating electrical energy for production of emitted light. The overlying layer of light activatable phosphorescent matter 168 placed over the light activatable matter can similarly be provided in the form of microencapsulated particles sealed in individual sheaths of moisture resistant light transmissive material. The overlying layer also can be of fluorescent material activated by the light of the electrically activated light emitting matter. The fluorescent matter can be on a light transmissive carrier film and can be selected to emit light of a different color from light emitted by the electrically activated light emitting matter, for example, red activated by green light.

As still another arrangement, microencapsulated light activatable phosphorescent particles can be intermixed or interlayered in light exposed relation to the microencapsulated particles of electrically activatable light emitting matter to provide a greater light persistence than is obtainable from the electrically activatable matter alone. Similarly the color of light emitted by the phosphorescent matter may be different from that of the light radiated by the electrically activated light emitting matter. Fluorescent particles alone or in combination with microencapsulated phosphorescent particles can also be intermixed or interlayered in light exposed relation to the microencapsulated electrically activated light emitting particles, each material being arranged to emit the same or different colored light.

In another arrangement, two or more different microencapsulated electrically activatable light emitting phosphors selected to produce different colored light outputs at different voltages or frequencies can be intermixed and interposed between overlying conductive electrodes, one or both of which are light transmissive.

Figure 16:
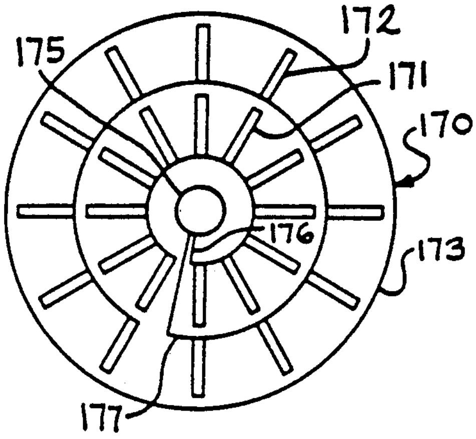
FIG. 16 illustrates an electroluminescent panel assembly of light strips extending from a central region in an outward direction to form a generally circular configuration of light strips.
Figure 17:
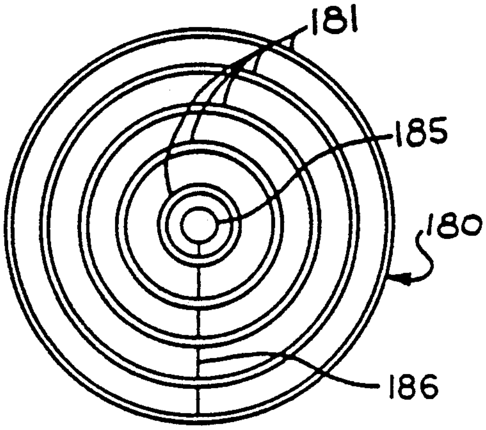
FIG. 17 illustrates still another circular electroluminescent panel assembly in which the light strips are of different diameters and arranged concentrically.

FIGS. 16 and 17 illustrate additional arrangements of electroluminescent segments for flexible adaptability to other use. FIG. 16 shows an arrangement of longitudinal light strips 171 and 172 aligned end to end on a base 173 of a lighting unit 170. An arrangement such as is illustrated lends itself to assemblage as a clock with analog appearing indication on a clock face. The lighting strips 171 and 172 are activated digitally by a power and timer circuit 175 located centrally of the array connected to the lighting strips by connecting leads 176 and 177 schematically illustrated.

To further illustrate the wide range of application the lighting strips can be oriented in a concentric circle array 180 as shown in FIG. 17 wherein the light field is made up of circular lighting strips 181 which are energized by a power switching circuit 185 located centrally and connected to the strips by way of conductors of a cable 186. Although circular light strips are here shown it will be recognized that any shape such as square elipses or any of a wide variety of shapes might be used in an array extending about a central region or an off center region. The strips 181 can be lit simultaneously or in sequence from the outside to the center or vice versa at different rates for any of a wide range of visual decorative effects. This arrangement as well as that of FIG. 16 also lend themselves to many game possibilities.

As another aspect of the type of assembly disclosed, the intermediate layer of phosphorescent material between electrodes can be doctor-bladed in place, or sprayed over an underlying electrode, or may be preformed and laid over the base electrode. The electrode layers can be a premade film or sheet of conventional electrically conductive electrode material, at least one of which is light transmissive, but one or both might also be a conductive composition material poured, doctor-bladed or aprayed in place to form an electrode. In such cases the electrode might be of resinous material containing electrically conductive particles such as copper or aluminum particles or an electrically conductive chemical composition in sufficient quantity to provide the conductivity adequate to allow establishment of the electrical forces across two electrodes to activate the phosphorescent matter therebetween to effect emission of light therefrom. In another sense, one or both electrodes might be of a composition including electrically conductive particles within a matrix of resinous material such as a plastisol having a transmissivity which will allow light to be transmitted therethrough from activated phosphorescent material thereunder.

As an example, profile drawings or images can be highlighted in luminescent form within non-luminescent surrounding portions of the profile or vice versa with light emitting portions surrounding non-luminescent images. FIG. 19 illustrates such an arrangement wherein the profile of a young lady, 191, of phosphorescent material can be applied, such as by masking techniques over an underlying electrode, 192, with an overlying light transmissive layer, 193, provided for electrical activation of the phosphorescent profile. The material, 194, surrounding the phosphorescent area of the profile can be of dielectric material which might be an electrically non conductive plastisol. In this regard, the layer of dielectric material is preferably of a low electrical loss material to reduce the power consumption by the assembly. FIG. 19A shows the cross section of the different materials interposed between the upper and lower electrode illustrated in FIG. 19.

Still another aspect of the arrangements of forming the phosphorescent and electrode layers, is their capability of providing one or each electrode layer as well as the phosphorescent material layer with different thicknesses within the boundries of the area over which they extend. Different intensities of light output thus can be provided from different segmental areas of the overall field of light produced from the assembly. A wide range of lighting results can thereby be generated, both functional and esthetic.

The proposed arrangement also lends itself to advantageous utilization of microencapsulated particles in the phosphorescent region from which light is to be generated. In this regard, different colored phosphorescent materials can be applied to different regions of the light field to be energized, thus adding to the range of capabilities of imparting functional and esthetic resultants to the assembly.

Where the EL layer is provided with different thicknesses in different segmental portions within its boundries, it can be arranged to generate different intensities of light from different segments of the desired output. Thus, rather than providing an image in which shading is provided by different intensities of pigment application, variations corresponding to shadings, hues or contrasts might be imparted to a light produced image in the form of such variations in light in different segmental regions of the image. FIG. 19B represents a phosphorescent layer, 191B, between uniform thickness electrode layers 193B and 192B, with the phosphor layer 191B having different thicknesses to produce such results. The variations in thickness might be gradual or sharp. Still further, the variations in thicknesses might be provided by application of different colors of material in the thick and thin regions of the image. An image might also be provided with an outline of one color while the main image portion is of another.

FIG. 20 illustrates another arrangement of the invention in which the image of a bell, 201, is illustrated in line form instead of in solid form as illustrated in the profile of FIG. 19. The underlying electrode, 202, and the overlying electrode, 203, can both be of conventional sheet form, while the overlying electrode, 203, might be made of a sprayed layer of conductive composition, such as plastisol incorporating electrically conductive matter, in sufficient concentration to provide the electrical activation of the phosphorescent matter for generation of the light output for the image desired. Different desired light images can also be produced by providing patterned differences in the thickness of the light transmissive electrode 203, as shown in FIG. 20A over the intermediate phosphorescent layer 201 overlying the bottom electrode 202 such that different electrical force effects will be produced across the different segmental regions of the expanse of the phosphorescent layer.

FIG. 20B illustrates still another arrangement for producing the novel lighting effects of the invention wherein both the top electrode 203B of the assembly has different thicknesses and the underlying layer 201B of phosphor matter has inversely different thicknesses over the expanse of the assembly. An overall light field or image can thus be produced having various desired light variations in the image or field provided by varying thicknesses in the electrode and phosphor layers.

Still other corresponding variations in light outputs of various sections of the light image might be produced by providing appropriate differences in concentrations of electrical matter in different segments of the overall expanse of either or both electrodes.

A wide range of image variations thus can result, utilizing variations in thickness within the layer of phosphorescent material or in one or both electrode layers, or variations in concentrations of electrically conductive matter within the area of either or both electrodes. Still further, variations in thickness in both the phosphorescent material and one or both electrodes can extend the range of light intensity variations and colors obtainable to produce light images desired for esthetic purposes such as a new light art or specific functional purposes including provision of new light forms permitting filling in of notes in overlying writing paper.

In view of the foregoing, it will be apparent that embossed or three dimensional imagery might also be produced by multiple layering and variation in thickness of layers in which the outer exposed visible layer is at least in part light transmissive to allow the three dimensional imagery to be visible externally of the assemblage.

Although the light emitting substance is referred to herein as "phosphorescent material", it will be understood that the invention may utilize any of a number of substances which will glow or emit light and accordingly the terminology "phosphorescent material", as used herein is meant to include chemiluminescent, bioluminescent, and solid state materials including any substance which will emit light without an apparent rise in temperature after exposure to a stimulus such as heat, light, or electric current, voltage, electric discharge and electrical signals.

In view of the foregoing it will be understood that many variations of the arrangement of the invention can be provided within the broad scope of principles embodied therein. Thus, while particular preferred embodiments of the invention have been shown and described, it is intended by the appended claims to cover all such modifications which fall within the true spirit and scope of the invention.

We claim:

1. An electroluminescent laminate assembly comprising a layer of electrically activatable particles of light emitting phosphor matter, said layer of electrically activatable particles interposed between a pair of layers of electrically conductive matter which function as electrodes for activation of said light emitting particles at least one of said conductive layers being transmissive to light of said light emitting particles, and one of said conductive layers having different thicknesses within the area of its major dimensions to (establish different) exert differing electrical (forces in) influences on preselected (segmental areas of the light emitted by) segments of said interposed layer of electrically activatable particles to produce different desired light output effects within the overall area of light output of said assembly.

2. An electroluminescent laminate assembly of claim 1 wherein an electrode having different thicknesses has a flat external face with thickness variations thereof matching inversely matched thickness variations in said layer of phosphor matter.

3. An electroluminescent laminate assembly of claim 1 wherein an electrode having different thicknesses is flat on its interior face adjacent the layer of phosphor matter and thickness variations in said electrode are on the exterior surface of the electrode.

4. An electroluminescent laminate assembly of claim 3 wherein preselected variations in concentration of electrically conductive matter is provided in the areas of thickness variation to exert electrical force variations on said layer of phosphor complementary with those of said thickness differences.

5. An electroluminescent laminate assembly comprising a layer of electrically activatable particles of light emitting phosphor matter, said layer of electrically activatable particles being interposed between a pair of layers of electrically conductive matter which function as electrodes for activation of said light emitting particles, said layer of electrically activatable particles being shaped into a pattern of an image to be defined by the light output of said particles, nonluminous electrical insulating material being present between said electrodes bounding the pattern of the light emitting phosphor matter, at least one of said conductive layers being transmissive to light of said light emitting matter and at least one of said electrode layers having preselected variations in concentration of conductive matter to exert differing electrical influences on the interposed layer of electrically activatable particles of light emitting phosphor matter to produce different desired light output effects from the overall area of light output of said assembly.

6. An electroluminescent laminate assembly comprising a layer of electrically activatable particles of light emitting phosphor matter, said layer of electrically activatable particles being interposed between a pair of layers of electrically conductive matter which function as electrodes for activation of said light emitting particles, said layer of electrically activatable particles being shaped into a pattern of an image to be defined by the light output of said particles, at least one of said conductive layers being transmissive to light of said light emitting matter and at least one of said electrode layers having preselected variations in concentration of conductive matter to exert differing electrical influences on the interposed layer of electrically activatable particles of light emitting phosphor matter to produce different desired light output effects from the overall area of light output of said assembly.

* * * * *